United States Patent
Troyer

[11] 3,979,537
[45] Sept. 7, 1976

[54] INSULATING MATERIAL AND METHODS OF MANUFACTURE

[75] Inventor: Richard Lloyd Troyer, Maumee, Ohio

[73] Assignee: Johns-Manville Corporation, Denver, Colo.

[22] Filed: June 30, 1975

[21] Appl. No.: 591,584

Related U.S. Application Data

[63] Continuation of Ser. No. 407,322, Oct. 17, 1973, abandoned, which is a continuation of Ser. No. 130,345, April 1, 1971, abandoned.

[52] U.S. Cl. ............................. 428/61; 52/404; 52/592; 428/77; 428/189; 428/192
[51] Int. Cl.² ...................... E04B 1/62; B32B 3/10
[58] Field of Search ............... 428/57, 58, 60, 61, 428/62, 77, 189, 190, 191, 192, 194; 52/404, 592

[56] References Cited
UNITED STATES PATENTS

| | | | |
|---|---|---|---|
| 1,438,780 | 12/1922 | O'Neil | 52/540 |
| 2,148,167 | 2/1939 | Lyman | 52/540 |
| 3,012,603 | 12/1961 | Newsome et al. | 428/126 |
| 3,121,649 | 2/1964 | Oliver | 156/71 |
| 3,140,220 | 7/1964 | Walter | 428/126 |
| 3,488,248 | 1/1970 | Long | 428/189 |
| 3,835,604 | 9/1974 | Hoffmann, Jr. | 428/192 |

Primary Examiner—Harold Ansher
Assistant Examiner—Charles E. Lipsey
Attorney, Agent, or Firm—Robert M. Krone; Joseph J. Kelly; John H. Miller

[57] ABSTRACT

An insulating material primarily for use on the interior of buildings and formed of a blanket of felted fibers (such as glass fibers) of relatively high density having an impervious flexible facing on one side for appearance and for defining a vapor barrier. The facing including a narrow edge strip extending beyond a margin of the fibers for defining a tab for overlapping and sealing a joint with an adjacent blanket. The marginal tab is protected during handling, shipping and installation by a disposable strip of insulation partially severed from the main body of the material but temporarily remaining in original position.

4 Claims, 15 Drawing Figures

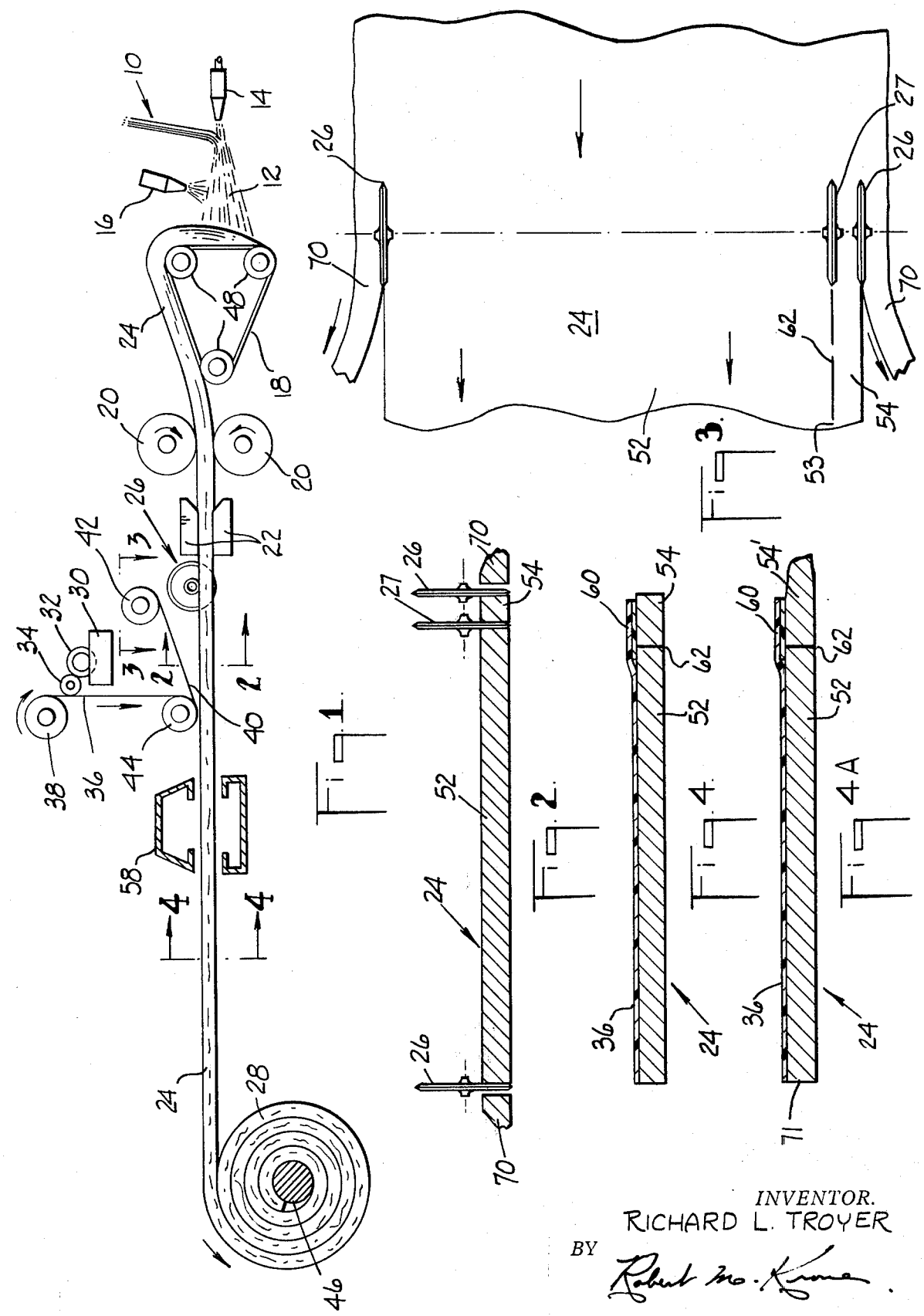

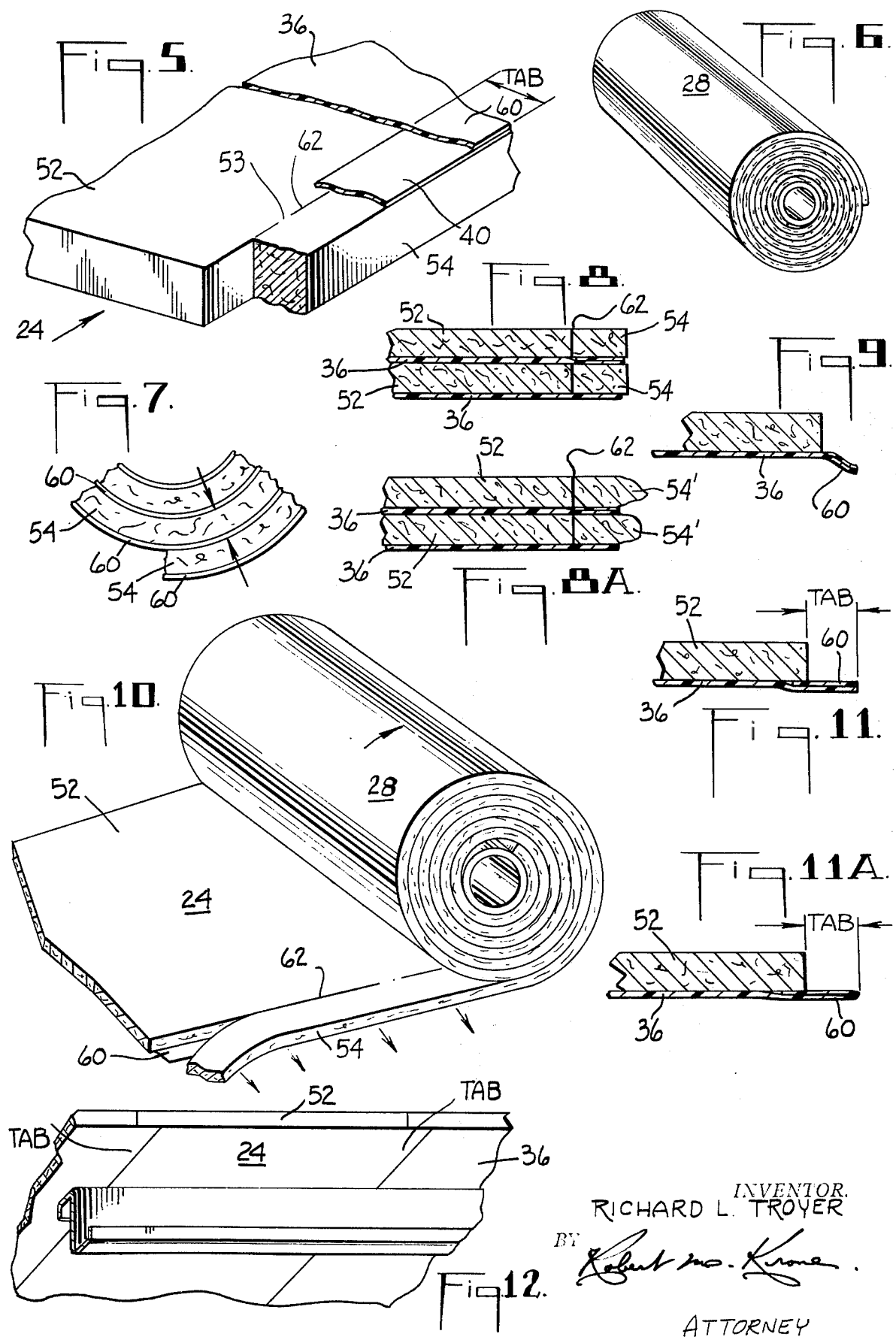

INSULATING MATERIAL AND METHODS OF MANUFACTURE

This is a continuation of Application Ser. No. 407,322, filed Oct. 17, 1973, and now abandoned, which was a continuation of Application Ser. No. 130,345, filed Apr. 1, 1971, and now abandoned.

BACKGROUND OF THE INVENTION

In the construction of metal buildings, for example, buidlings having corrugated sheet metal walls and roofs, insulating materials with moisture impervious facings line the inside for purposes of insulating the building as well as improving appearance. The roofs of such buildings presented problems when blanket of glass wool insulation is used. Unless the blanket was supported on close centers, it had a tendency to sag giving an unsightly appearance. If the facing was to form a moisture impervious surface, tabs extending from the longitudinal margins of the blanket insulation were required to be stapled or glued together. Often a sealing strip was secured over the longitudinal seam between blankets.

One approach for an insulating layer in the above type construction is the use of a rigid or semi-rigid board of felted fibers. Such board has heretofore been cut in relatively short lengths to facilitate handling and shipping. These short lengths require frequent end joints which increase the potential for heat loss and are unattractive. When faced with a sheet of a material providing vapor barrier, and in some instances a decorative finish, the end joints of the facing require additional installation effort and further detract from the final appearance.

The present insulating material overcomes the above problems with a rigid or semi-rigid roll of blanket insulation having a length suitable to span a plurality of framing elements and frequently of such length as to extend across an entire building surface. For example in roof installations, the board may extend the length of the roof and offer sufficient rigidity to resist sagging between purlins on 4 - 6 foot centers. In addition, the insulating material has a tab of facing material extending from its margin with sufficient stiffness for overlapping an adjacent blanket. This tab is protected in shipping to maintain its shape allowing the blankets to be butted and a relatively impervious seal obtained between blankets without stapling or gluing.

SUMMARY

The present apparatus and methods relate to thermal insulating materials and more particularly to a blanket of glass fiber insulation and the methods of forming the blanket and fabrication of the blanket and its facing.

A thermally insulating body is disclosed in the preferred embodiment as a blanket of resin bonded glass fibers having major flat faces with longitudinal margins. The blanket is slit longitudinally along one side just a short distance inward from the edge to define an edge strip which is temporarily held in position by the slit being an incomplete or perforated slit. The edge strip is adapted for physical removal as a later step. The edge strip is at least equal in width to the tab to protect the tab from being crushed or displacement relative to that portion of the facing secured to the primary blanket. The edge strip remains temporarily in position to provide a protective body adjacent the tab.

The blanket is formed by bonding fibers which are thermally insulating into a blanket, longitudinally slitting the blanket in a perforating manner to form a primary blanket and an edge strip, preferably with the strip paralleling a margin and securing a tab of sheet material to the primary length of blanket in registry with the edge strip of blanket to allow the edge strip of blanket to protect the tab during handling.

The tab may be reinforced by means such as folding a portion of the facing sheet upon itself or by use of a supplemental tape. When the latter method is used, the blanket with a thin flexible facing sheet and a supplemental tape is to be bonded to the blanket. The facing and tape are simultaneously applied to the blanket with the tape lying between the facing and the blanket in registry with the edge strip already formed by slitting the blanket along its longitudinal margin. The combination is cured in an oven to set the adhesive and then wound on a mandrel of sufficient diameter to prevent the blanket from obtaining a permanent set to enable it to unroll to a flat form. Since the tape is impervious to the adhesive, it masks the facing from the edge strip making the edge strip removable along the slit when the tab is to be exposed. At the same time, the tape beneath the tab overlaps to the primary blanket by a short distance. The tape also reinforces the tab.

The present insulating blanket eliminates the need for stapling of gluing of tabs to form a vapor barrier as required in the prior art. Use of the tape and protective, disposable, edge strip like protective portion eliminates wrinkles of the tab to give a better appearance. The rigidity of the blanket by reason of relative high density eliminates sagging and makes it easier to handle. Appearance is also enhanced because the flat overlapping tab is hardly discernible giving a smooth finish impression.

BRIEF DESCRIPTION OF THE DRAWINGS

FIG. 1 is a simplified schematic of an elevational view of a line for manufacturing blanket insulation;

FIG. 2 is a cross-sectional view taken generally along line 2—2 of FIG. 1 and showing a slitting operation;

FIG. 3 is a plan view of the slitting operation of FIG. 2 taken generally along line 3—3 of FIG. 1;

FIG. 4 is a cross-sectional view taken generally along line 4—4 in FIG. 1;

FIG. 4A is a cross-sectional view similar to FIG. 4 but showing a different embodiment;

FIG. 5 is a fragmentary perspective view of the blanket insulation with cut-away portions to illustrate the disposable edge strip, tape and sheet;

FIG. 6 illustrates a roll or package of insulating material;

FIG. 7 is a fragmentary end-view of rolled insulating blanket for illustrating relative positions of edge strip and tab;

FIG. 8 another fragmentary view illustrating relative position of edge strip and tab;

FIG. 8A is similar to FIG. 8 but showing a different embodiment;

FIG. 9 illustrates a deformed tab;

FIG. 10 illustrates a roll of insulation partially unrolled and showing partial removal of the edge strip to expose the tab;

FIG. 11 is a cross-sectional view of a portion of the blanket and tab;

FIG. 11A is a cross-sectional view similar to FIG. 11 but showing a different embodiment; and FIG. 12 is a perspective view of several strips of insulating material over a roof purlin in side by side relationship.

DESCRIPTION OF THE PREFERRED EMBODIMENT

Referring to FIG. 1 a manufacturing line in schematic form is illustrated for the manufacture of blanket insulation of fiber glass wool wherein filaments 10 are formed into elongated glass fibers 12, softened by a flame attenuator 14, and coated with binder by the binder applicator 16 to form a blanket 24 on the chain belt 18. The thickness of the blanket 24 is exaggerated for illustration purposes. The blanket 24 passes between the hot rolls 20 where the surfaces are cured and onto platens 22 where the insulation is cured to the desired thickness. Spaced apart rotary knives 26 trim the edges of the blanket 24 while a slotted disc 27, turning against a back-up roll (not shown) at a peripheral speed equal to the linear speed of blanket 24, slits the blanket in a perforated manner to form an easily disposable strip like blanket portion 54 along one longitudinal margin 62 of the blanket. Any other means may be used just so the edge strip is at least partially severed from the blanket for subsequent physical removal. Immersed in an adhesive bath 30 is a roll 32 having a doctor roll 34 for applying adhesive to facing 36 being fed from facing roll 38. As the facing 36 with adhesive thereon is advanced toward the blanket 24, it is joined by tape 40 from roll 42 and both are brought in contact with the blanket 24, at the point of tangency between the blanket 24 and directional roll 44. The combination is passed through an oven 58 where the adhesive is cured to form a bond between the facing 36 and blanket 24 and tape 40 respectively. What has been formed is a rigid blanket of thermal insulation having a thin flexible facing 36. A longitudinal portion thereof overhangs the blanket 24 as a cantilevered tab when portion 54 of the blanket formed by the perforated slit is removed. That tab, reinforced by tape 40, can be used to seal butted joints when lengths of blanket 24 are installed side by side. Finally, the blanket 24, including edge strip 54 is wrapped or packaged in rolls 28 about a mandrel 46 to form a convenient handling package.

While the line outlined above produces, in the preferred embodiment, a glass fiber blanket 24 it is to be understood that other materials can be fiberized by the usual means of spinning, drawing attenuating and blowing for all or part of the insulating blanket. The glass fibers 12 are formed from filaments softened by the flame attenuator 14 to attenuate the filaments into lengths of individual elongated fibers 12. Collection of the fibers 12 on the chain belt 18 results in a build-up to form a blanket on the belt 18 as it is continuously moved around the supporting rolls 48. Sufficient adhesion in the binder, applied by the binder applicators as the fibers 12 are attenuated, exists to maintain the fibers in a loose blanket 24. The blanket 24 is then passed through the hot rolls 20, which are rotated, to cure the surfaces of the major faces of the blanket 24 by virtue of the heat released from the hot rolls 20. In passing between the platens 22 the surface cured blanket 24 is pulled through an opening formed by parallel inner faces of the opposing platens 22 which is smaller than the thickness of the entering blanket 24. By compressing the blanket as it is pulled past the platens 22 and applying heat from the platens 22 the blanket is given the desired thickness and cured to retain its shape annd give it rigidity. In the utilizations contemplated here, densities of the order of 1 to 2 pounds per cubic foot have been employed in thicknesses of from 1 to 3 inches with sufficient binder to avoid any substantial sag of faced material when supported on five foot centers. Division of blanket 24 into the primary portion 52 and secondary edge strip portion 54, which becomes a readily detachable strip, is accomplished with a slotted circular saw 27 against a backing roll (not shown) to leave readily severable bridges 53 of insulating wool between 52 and 54, see FIG. 5.

Although glass fibers are preferred due to their ease of formation and thus economical availability in fine diameters and appropriate lengths, other common materials which can be fiberized as by usual means of spinning, drawing, attenuating, blowing, etc. into fine diameter fiber can be employed exclusively or in part in the formation of the mat. These may include known products manufactured from various source materials of silicates of metal oxides, such as rock woods from argillaceous matter or shale, slag wool from metallurgical slags, each commonly referred to as "mineral wools", aluminum silicate fibers and any fibers of the so-called glasses.

A thin flexible facing 36 is placed atop the blanket or board over its full width fed from the facing roll 38 as illustrated in FIG. 1. Typical of the facings 36 used are unplasticized films such as chlorinated polyethylene and polyvinyl chloride. Other moisture impervious films may be used. An adhesive bath 30 with a roll 32 rotating in a supply of adhesive in the bath 30 is provided to apply a controlled amount of adhesive to a doctor roll 34 which in turn applies the adhesive to the inner face of the facing 36 before it is joined on the directional roll 44 by the supplemental tape 40, which may be a more flexible vinyl. Tape 40 reinforces tab 60 and prevents adherence of strip portion 54 to facing 36. The tape roll 42 feeds tape 40 onto the directional roll 44 which is rotated to apply facing 36 and tape 40 to the blanket at the point of tangency between the roll 44 and the surface of the blanket 24. Curing of the adhesive to form a bond between the facing 36 and blanket 24 and between the facing 36 and the tape 40 is accomplished by heating the combination in an oven 58. Strip portion 54 is not adhered to facing 36 or tape 40. The blanket insulation, now complete with facing 36 and tape 40, is wrapped around a mandrel 46 which is driven by conventional means, not illustrated, by attaching the leading end of the blanket 24 to the mandrel. The smallest radius of wrap is large enough to prevent a set in the blanket 24 so that the blanket 24 retains its flat shape upon being unrolled. Substantial lengths, for example in excess of one hundred feet, are wound in rolls 28 and then the blanket 24 is transversely severed by a conventional means, not illustrated, e.g. a shear. The rolled blanket 24 is removed from the mandrel and the new leading edge attached to the mandrel 46 to continue the process. Side strip 54 is temporarily held in position under tab 60 by friction therebetween or by its incomplete severance from the primary blanket, or by both. If severance is complete throughout the margin, friction against the tab alone is normally sufficient to hold the strip in temporary position. The side strip temporarily protects the tab from deformation by being adjacent it for providing stiffening or backing. It is effective during packaging, such as placing in a roll, and subsequent handling and unrolling for use. The strip is manually removable to expose the tab in cantilevered projection from the primary blanket.

The fabrication and purpose of the blanket 24 when completed with its facing 36 and tape 40 can be better understood by viewing the product as illustrated in FIG. 5. A fragmentary portion of the blanket 24 is illustrated with its facing 36, tape 40, and secondary edge strip portion 54 of the blanket all cut back for illustrative purposes. The primary portion of the blanket 52 in 1 ½ inch thickness and 1 pound density, having a facing sheet of 4 mil unplasticized chlorinated polyethylene and 3 mil plasticized vinyl tape, will sag only a ¼ inch when supported on five foot centers because of the rigidity given to the blanket by the curing of the platens 22. The rigidity enables the primary portion 52 of the blanket to support a tab 60 created by the overhang of tape 40 and facing 36 when the secondary portion 54 or detachable strip of blanket 24 is simply broken away along the longitudinal margin 62. The tape 40 offers the advantage that it is impervious to the adhesive on the facing 36 and masks the detachable edge strip 54 from the adhesive to maintain it free for removal. At the same time, the tape 40 overlaps the primary portion 52 and is attached by adhesion to the facing 36 lending reinforcement to the tab in the transverse direction as well as the longitudinal direction of the blanket 24.

The tab 60 is protected from deformation relative to the blanket 24, e.g., bending or wrinkling, by the detachable strip 54 remaining adjacent thereto up until the time of use. By overlapping the tabs 60 as illustrated in FIG. 12 a moisture barrier between blankets is obtained simply by butting the blankets side-by-side. It is, therefore, important that the tab 60 be maintained flat prior to assembly in order to form the seal. In addition, the flat tab 60 gives a neat appearance being hardly discernible.

The reinforcing tape 40 in the preferred embodiment is plasticized vinyl which conforms with the expansion of stretching of the facing 36 to prevent wrinkling of the facing 36 and tab 60. Other flexible materials could be used.

It should be understood that the blanket 24 can be manufactured in widths other than 5 foot increments and that, while 1 ½ inch thickness is preferred, thickness as of 1 to 3 inches can be manufactured.

The rigidity and, therefore, the sag of the blanket 24 varies with thickness and density of the blanket. A typical density is one pound per cubic foot. Since rigidity increases with an increase in density, the density can be varied to obtain a desired rigidity.

Additional facing second tabs on the margins of the blanket could be produced if desired. A blanket with two tabs could be used in a similar manner to the blankets of the prior art by pulling adjacent tabs of butted blankets together along the edges of the longitudinal margin and stapling the tabs.

While the widths of the tab 60 and tape 40 are variable, the preferred widths are 2 ½ inches for the tab 60 with the tape 40 extending another ½ inch to lap the face of primary portion 52 of the blanket 24 giving it a width of 3 inches.

FIG. 6 illustrates a rolled package with edge strips rolled therewith. FIG. 7 which is a fragmentary end view showing edge strips 54 rolled in position against tabs 60 for temporarily protecting them by providing a backing or packing mass. Preferably edge strips 54 are not completely severed from main portion 24, but as indicated the wound arrangement would be sufficient to temporarily retain them in position by friction even if severed. Preferably strips 54 are slightly wider than tab 60 for providing more protection for the tab.

As illustrated in FIGS. 2 and 3 the very side extremity 70 is trimmed away by rotating saws 26 and is immediately discarded as scrap. Slotted circular saw 27 pressing against a back-up roll severs edge strip 54 in a manner previously discussed. FIG. 4 illustrates the substantially completed product further down the forming line as illustrated in FIG. 1 generally along line 4—4 prior to being rolled into a package.

An equally preferred, and possibly more economical, form of the invention is illustrated in FIG. 4A. Herein it will be noted that only one side extremity of blanket 24 has been trimmed away, i.e. at side 71. The other side extremity is not trimmed by a saw 26 as before and the side remains unsevered. In this alternate embodiment, as illustrated in the cross-sectional embodiment of FIG. 4A, it will be noted that an edge strip 54' underlies tab 60 for the purpose previously described. Its untrimmed side remains protruding therefrom to provide greater endwise protection for tab 60. In this embodiment slotted slip 62 is made as before so that edge strip 54' can be removed at time of installation.

FIG. 10 illustrates a package of packaged insulation in the process of being unrolled and strip 54 being pulled from its position to expose tab 60. Without the benefit of strip 54 or 54' during handling, it is obvious that endwise force on the tab of the insulation, whether in package form or not, would cause physical deformation as indicated in FIG. 9. This, of course, would interfere with its appearance and sealing efficiency.

As previously indicated, sagging of a panel of insulation supported on 5 foot centers is minor, in the range of ¼ inch. With tape 40 reinforcing tab 60, sag at the tab will be even less thereby resulting in the tab being pulled closer onto the adjacent panel.

The purpose of tape 40 and the method by which it was installed have been previously disclosed in this specification. Another embodiment of tab 60 is illustrated in FIG. 11A where a portion of sheet 36 is folded back over itself for purposes of strengthening the tab and for preventing adhesive from coming into contact with the fibers of edge strip 54 or 54'. In the forming process as illustrated in FIG. 1, tape 40 from roll 42 would be eliminated and sheet facing 36 would have a portion at its edge folded upon itself after adhesive is applied and prior to coming in contact with blanket 24. It will be noted that since the facing is impervious to the adhesive that no adhesive will come into contact with the fibers of edge strip 54, 54' for reasons previously disclosed.

Advantages of the insulating blanket include its boardlike rigidity, its convenient roll packaging, and its protected integral tab 60. There is an elimination of the stapling requirement of the prior art blankets or a separate taping of joints by the combination of a rigid blanket having characteristics of board which holds its shape without stretching. The smooth flat tab 60 can form a substantial moisture barrier by simply overlapping an adjacent butted blanket 24. The need of additional supports to overcome the sag of blankets of the prior art is also eliminated. The overlap of the tab 60 conceals the butted joint between blankets and gives the impression that a series of blankets 24 joined together are a single smooth surface. Handling of the blanket 24 is also enhanced by the rigidity of the blanket making it easier to handle and position in place.

It is to be understood that the detailed embodiment of the invention described above lends itself to modification including changes in materials, the physical characteristics and the form of the insulating system. Thus, the overhanging facing utilized as a seam closing tab can be utilized in flat packaged insulating board where a protective, disposable strip is provided. Accordingly, it should be appreciated that the above disclosure is to be read as illustrative and not in a limiting sense.

I claim:

1. A continuous insulating layer having at least one finished seam free of adhesive, staples, or other fastening means, which seam provides a vapor barrier, said layer being supported by supports 4–6 feet apart and running transversely of said seam, said layer and seam comprising:
  a. a longitudinal edge of a first resilient blanket of fibers comprised of glass bonded together and having a density in the range of about 1–2 lbs/cu. ft., said blanket being faced on the major face adjacent to said supports with a flexible vapor impervious facing sheet having an edge that essentially coincides with said longitudinal edge to form a first panel, said panel being semi-rigid to have minor sag when so supported, and
  b. a longitudinal edge of a second resilient blanket having the major surface adjacent to said supports faced with a vapor impervious facing to form a second panel having essentially the same characteristics as said first panel, said facing on said second blanket extending beyond said longitudinal edge to form a tab, the first and second blankets being butted together along said longitudinal edges such that the tab overlaps the facing on said first resilient blanket to form said seam, strip reinforcement means adhered to said tab and located on that portion of the tab contacting the facing on the adjoining blanket to provide the tab with greater resistance to sagging than the remainder of the insulating layer resulting in the tab being pulled closer against the facing of the adjacent panel to form said sealed seam, the width of said strip reinforcement means being greater than the width of said tab so that said strip reinforcement means overlaps a portion of said second resilient blanket.

2. An insulating layer as defined in claim 1 wherein said strip of reinforcement comprises plasticized vinyl adhesively bonded to said facing.

3. An insulating layer as defined in claim 2 wherein said strip is about 3 mils thick.

4. An insulating layer as defined in claim 3 wherein said blanket is about 1–3 inches thick.

* * * * *